(12) United States Patent
Takahashi

(10) Patent No.: US 9,075,512 B2
(45) Date of Patent: Jul. 7, 2015

(54) DISPLAY CONTROLLING DEVICE, DISPLAY CONTROLLING METHOD, AND COMPUTER READABLE MEDIUM THEREFOR

(71) Applicant: Yusaku Takahashi, Kariya (JP)

(72) Inventor: Yusaku Takahashi, Kariya (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 281 days.

(21) Appl. No.: 13/853,184

(22) Filed: Mar. 29, 2013

(65) Prior Publication Data

US 2013/0263046 A1    Oct. 3, 2013

(30) Foreign Application Priority Data

Mar. 30, 2012   (JP) .................................. 2012-081045

(51) Int. Cl.
*G06F 3/048*     (2013.01)
*G06F 3/00*      (2006.01)
*G06F 3/0484*    (2013.01)
*H04N 1/00*      (2006.01)

(52) U.S. Cl.
CPC .......... *G06F 3/0484* (2013.01); *G06F 3/04847* (2013.01); *H04N 1/00411* (2013.01); *H04N 1/00435* (2013.01); *H04N 1/0048* (2013.01); *H04N 1/00482* (2013.01); *H04N 2201/0094* (2013.01)

(58) Field of Classification Search
CPC .............. G06F 3/0484; G06F 3/04847; H04N 1/00411; H04N 1/00435

USPC ........................................................ 715/788
See application file for complete search history.

(56) References Cited

U.S. PATENT DOCUMENTS

| | | | |
|---|---|---|---|
| 7,164,422 B1* | 1/2007 | Wholey et al. ............. | 345/440.1 |
| 8,832,590 B1* | 9/2014 | Al-Mohssen .................. | 715/785 |
| 2011/0131496 A1* | 6/2011 | Abram et al. .................. | 715/722 |
| 2011/0191213 A1* | 8/2011 | Mora et al. ....................... | 705/30 |
| 2011/0191699 A1* | 8/2011 | Cunningham et al. ........ | 715/762 |
| 2012/0216115 A1* | 8/2012 | Lorenceau ..................... | 715/704 |
| 2013/0271367 A1* | 10/2013 | Umekawa ..................... | 345/156 |
| 2014/0365407 A1* | 12/2014 | Brown et al. ................... | 706/11 |

FOREIGN PATENT DOCUMENTS

JP           2011-34515 A        2/2011

* cited by examiner

*Primary Examiner* — David Phantana Angkool
(74) *Attorney, Agent, or Firm* — Scully, Scott, Murphy & Presser, PC

(57) ABSTRACT

A display controlling device, including a setting window displaying unit to control a display device to display a setting window with a plurality of display areas, an input receiving unit to receive input of a setting value for the setting item, and a display controlling unit to display one of the display areas in a distinguishable appearance, in which the one of the display areas is presented to be distinguishable from the remainder of the display areas, is provided. The display controlling unit switches the distinguishable appearance of the display areas in accordance with a predetermined switching manner each time the input of the setting value for the setting item displayed in one of the display areas being displayed in the distinguishable appearance is received.

12 Claims, 8 Drawing Sheets

FIG. 3
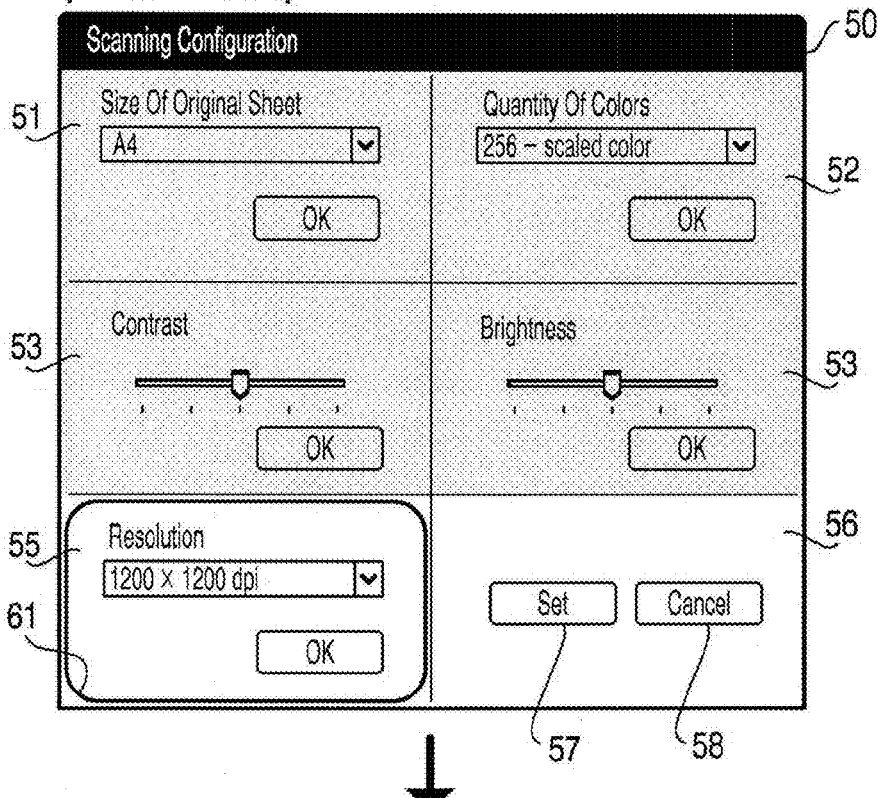
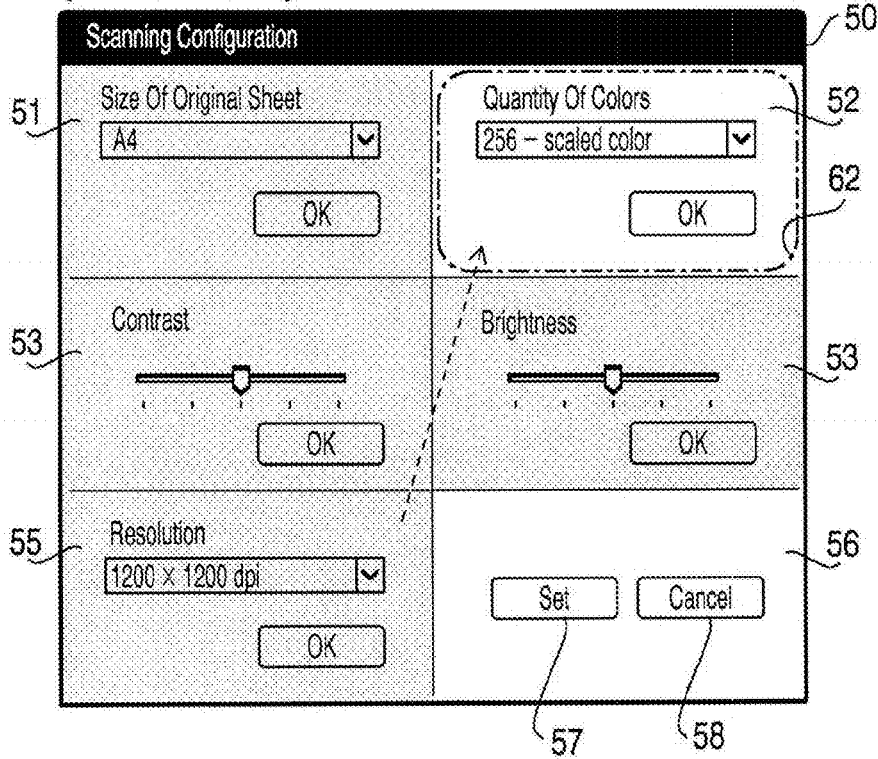

FIG. 5
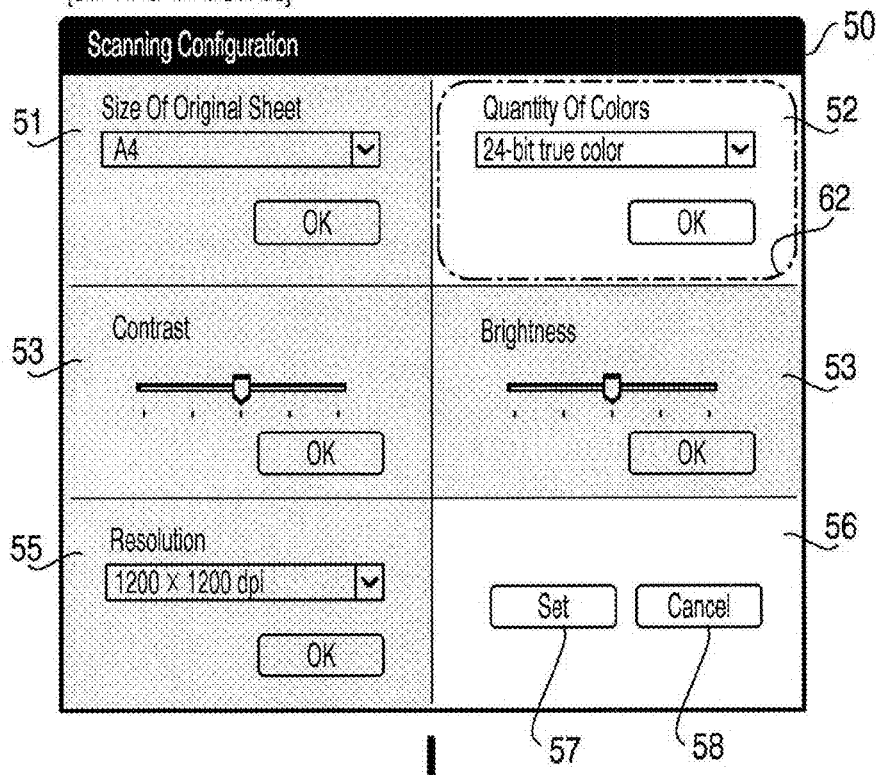
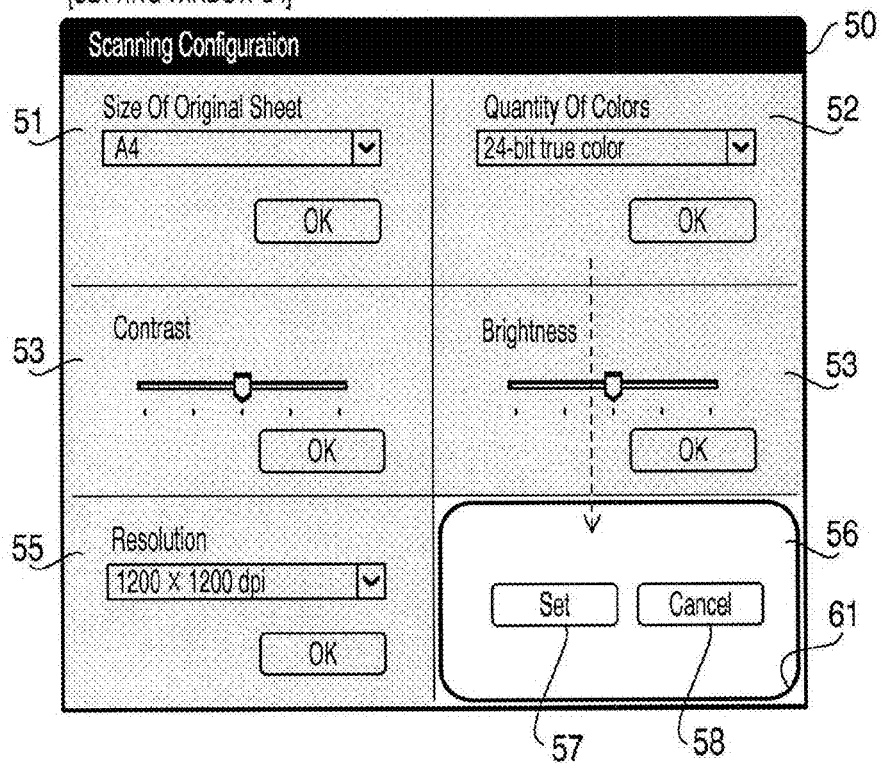

DISPLAY CONTROLLING DEVICE, DISPLAY CONTROLLING METHOD, AND COMPUTER READABLE MEDIUM THEREFOR

CROSS REFERENCE TO RELATED APPLICATION

This application claims priority from Japanese Patent Application No. 2012081045, filed on Mar. 30, 2012, the entire subject matter of which is incorporated herein by reference.

BACKGROUND

1. Technical Field

An aspect of the present invention relates to a display control device capable of controlling manners to display a plurality of setting items, a method for controlling the display, and a computer readable medium therefor.

2. Related Art

Information processing apparatuses, e.g., personal computers (PC), and peripheral devices, e.g., printers and scanners, which are used in connection with the PCs, are often equipped with display devices, through which various types of information are displayed. By the display device, a screen, through which various types of setting items concerning behaviors of the apparatus can be presented, is displayed so that a user can recognize optional values for the setting items and enter preferable options through the screen arbitrarily.

Meanwhile, as the apparatuses and devices tend to be equipped with more and more functions recently for providing more detailed and helpful services, a quantity of setting items to be set for each function or application tends to increase. Therefore, while the quantity of setting items increases, the setting screens tend to be displayed in complicated matters, and the user may not necessarily find the setting screens convenient or useful. In particular, for a user who is not familiar with behaviors and setting structures of the apparatuses, it is often difficult to find correct parameters that the user wishes to use, and in which priority the parameters should be set.

In consideration of the difficulty, a technique to improve operability in a parameter-setting process, in which a user selects items to be set and enters preferable parameters for the items, has been suggested. For example, a setting screen may be divided into a plurality of areas, which include an optional items displaying area, a selection making area, and a selected parameter displaying area. A user may select one of the optional items displayed in the optional items displaying area and drag a selected one of the items to drop it on the selection making area, in which further options (available parameters) for the selected item are displayed. Further, the user may select one of the parameters displayed in the selection making area and drag the selected parameter to drop on the selected parameter displaying area. Thus, the parameter for the item among the plurality of optional items is determined

SUMMARY

According to the abovementioned technique, however, the optional items to be set are listed plainly in the optional items displaying area; therefore, the inconvenience, that the user's operability is worsened as a quantity of items increases to be larger, remains unsolved. In particular, the user's difficulty to find correct priority for setting the parameters remains.

Meanwhile, as a method which helps a user to input necessary parameters, a format so-called "wizard" dialogue, in which setting items are presented one at a time in sequence, and the user is prompted to input the necessary parameters according to the sequence, is known.

The wizard format, however, may not necessarily provide better or more improved operability. For example, in many cases, solely one item is presented at a time in the wizard screen, and the screens are switched from one to another sequentially as the user's selection is entered. Therefore, after a parameter for one item is set in a first screen, the user is prompted to set a parameter for a second item in a second screen but is not allowed to skip to a fifth screen to set a parameter for a fifth item. For another example, when a parameter having been set in an earlier screen is to be modified, the user needs to return to the earlier screen by tracing backward the screens one-by-one. These operations may be redundant or cumbersome to, for example, an experienced user.

In consideration of the inconvenience, the present invention is advantageous in that a user-friendly display controlling device and a method for controlling displays, which enable users to set parameters easily and smoothly, are provided. In particular, a display control device, which controls an apparatus to be efficiently operable and user-friendly to both a user who is not familiar with behaviors of the apparatus and an experienced user, and a method for controlling the displays, are provided.

According to an aspect of the present invention, a display controlling device is provided. The display controlling device includes a setting window displaying unit configured to control a display device to display a setting window, in which a plurality of display areas are arranged, each of the display areas being configured to display a different setting item; an input receiving unit configured to receive input of a setting value for the setting item; and a display controlling unit configured to display one of the display areas in a distinguishable appearance, in which the one of the display areas is presented to be distinguishable from the remainder of the display areas, while the remainder of the display areas is displayed in a regular appearance. The display controlling unit switches the one of the display areas being displayed in the distinguishable appearance to be displayed in the regular appearance and another one of the display areas being displayed in the regular appearance to be displayed in the distinguishable appearance in accordance with a predetermined switching manner each time the input of the setting value for the setting item displayed in the one of the display areas being displayed in the distinguishable appearance is received.

According to another aspect of the present invention, a method for controlling displays in a display device is provided. The method includes controlling the display device to display a setting window, in which a plurality of display areas are arranged, each of the display areas being configured to display a different setting item; receiving input of a setting value for the setting item; and displaying one of the display areas in a distinguishable appearance, in which the one of the display areas is presented to be distinguishable from the remainder of the display areas, and displaying the remainder of the display areas in a regular appearance. The distinguishable appearance of the display areas is switched so that the one of the display areas being displayed in the distinguishable appearance is displayed in the regular appearance and another one of the display areas being displayed in the regular appearance is displayed in the distinguishable appearance in accordance with a predetermined switching manner each time the input of the setting value for the setting item displayed in the one of the display areas being displayed in the distinguishable appearance is received.

According to another aspect of the present invention, a non-transitory computer usable medium containing computer readable instructions to control a computer to function as a setting window displaying unit configured to control a display device to display a setting window, in which a plurality of display areas are arranged, each of the display areas being configured to display a different setting item; an input receiving unit configured to receive input of a setting value for the setting item; and a display controlling unit configured to display one of the display areas in a distinguishable appearance, in which the one of the display areas is presented to be distinguishable from the remainder of the display areas, while the remainder of the display areas is displayed in a regular appearance. The display controlling unit switches the one of the display areas being displayed in the distinguishable appearance to be displayed in the regular appearance and another one of the display areas being displayed in the regular appearance to be displayed in the distinguishable appearance in accordance with a predetermined switching manner each time the input of the setting value for the setting item displayed in the one of the display areas being displayed in the distinguishable appearance is received.

According to another aspect of the present invention, a display controlling device is provided. The display controlling device includes a display unit configured to display information; an input unit configured to input a setting value for a setting item; and a control device configured to control the display device to display a setting window, in which a plurality of display areas are arranged, each of the display areas being configured to display a different setting item; receive the setting value for the setting item inputted by the input unit; and display one of the display areas in a distinguishable appearance, in which the one of the display areas is presented to be distinguishable from the remainder of the display areas, while the remainder of the display areas is displayed in a regular appearance, wherein the distinguishable appearance of the display areas is switched so that the one of the display areas being displayed in the distinguishable appearance is displayed in the regular appearance and another one of the display areas being displayed in the regular appearance is displayed in the distinguishable appearance in accordance with a predetermined switching manner each time the input of the setting value for the setting item displayed in the one of the display areas being displayed in the distinguishable appearance is received.

BRIEF DESCRIPTION OF THE ACCOMPANYING DRAWINGS

FIG. 3 illustrates a flow of highlighting frames in the scanning configuration setting window to be displayed when a conflict of parameters occurs in the information processing system according to the embodiment of the present invention.

FIG. 5 illustrates a flow of highlighting frames in the scanning configuration setting window to be displayed when the conflict is settled in the information processing system according to the embodiment of the present invention.

DETAILED DESCRIPTION

Hereinafter, an embodiment of the present invention will be described with reference to the accompanying drawings. It is noted that various connections are set forth between elements in the following description. These connections in general, and unless specified otherwise, may be direct or indirect, and this specification is not intended to be limiting in this respect.

Figure 1:
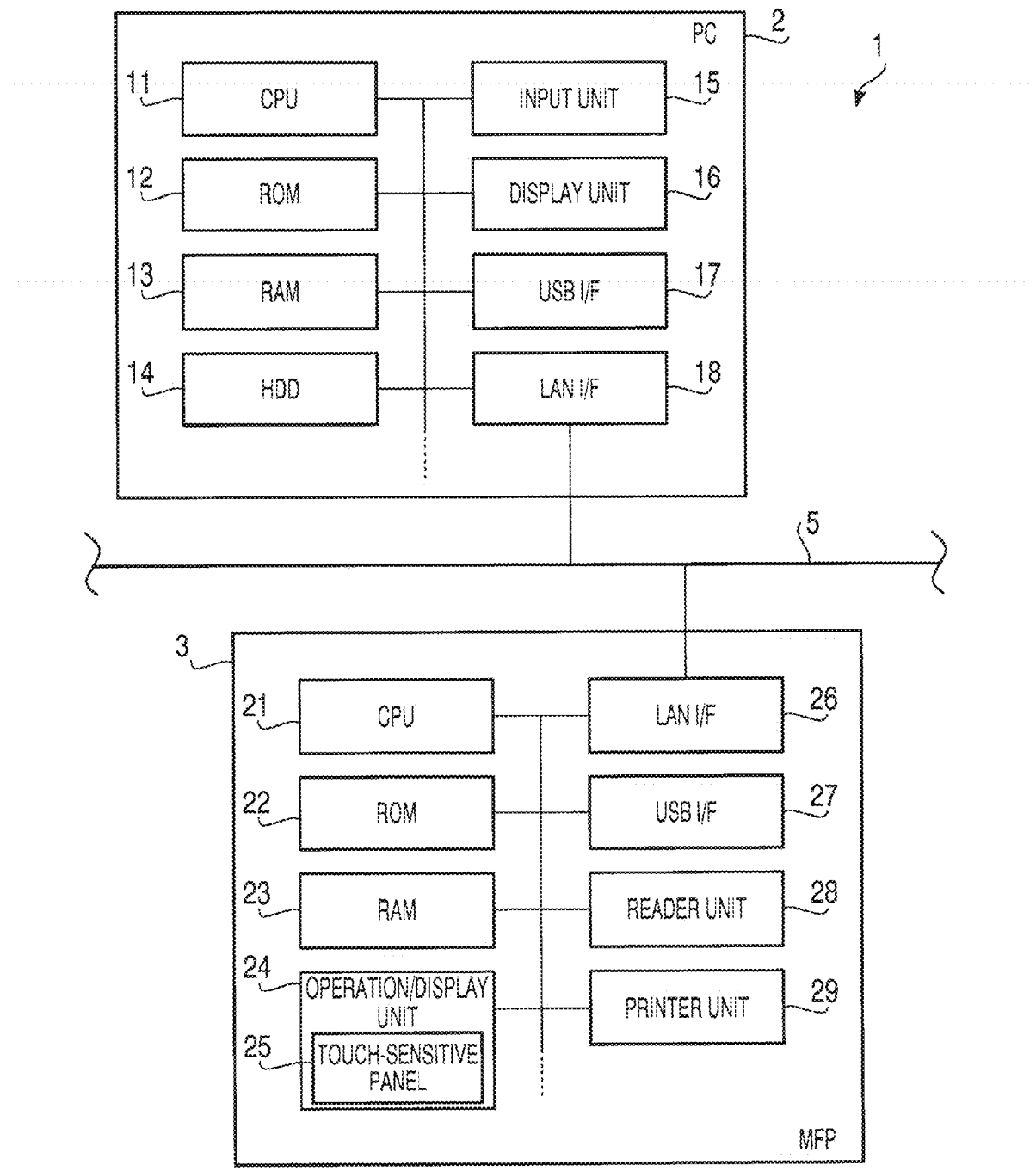
FIG. 1 is a block diagram to illustrate an overall configuration of an information processing system according to an embodiment of the present invention.

An information processing system 1 according to the embodiment includes, as shown in FIG. 1, a personal computer (PC) 2 and a multifunction peripheral device (MFP) 3, which are mutually connected to communicate with each other via a network 5. The MFP 3 is a multifunctional device having a plurality of functions including an image reading function to read by scanning an original image from an original medium, and a printing function to form an image on a recording medium such as a recording sheet and an OHP sheet.

The PC 2 includes a CPU 11, a ROM 12, a RAM 13, a hard disk drive (HDD) 14, an input unit 15, a display unit 16, a USB interface (I/F) 17, and a LAN interface (I/F) 18. The input unit 15 includes known input devices, which are to be touched or moved by a user such as a keyboard and a mouse. The display unit 16 includes a display device, such as a liquid crystal display.

In the HDD 14, various types of software programs are installed. The software programs include a scan-handling program, which controls the PC 2 to communicate with the MFP 3 and manipulate the scanning function of the MFP 3 to read the original image. The scan-handling program may control the PC 2 to receive image data, which is generated in the MFP 3, from the MFP 3.

When the scan-handling program is activated to read the original image, the scan-handling program runs in accordance with various types of configurable parameters for setting items. The parameters for setting items in the scan-handling program can be set by a user. The setting items may include, for example, a size of an original sheet being the original medium, a quantity of colors, and a resolution to read the image. When the user of the PC 2 inputs an instruction for the MFP 3 to read the image from the PC 2 via the scan-handling program, or when the scan-handling program is activated by a scanning event transmitted from the MFP 3 to the PC 2, the parameters for the items set in the scan-handling program are transmitted from the PC 2 to the MFP 3. Thus, the MFP 3 is enabled to read the image in accordance with the parameters received from the PC 2.

The MFP 3 includes a CPU 21, a ROM 22, a RAM 23, an operation/display unit 24, a LAN interface (I/F) 26, a USB interface (I/F) 27, a reader unit 28, and a printer unit 19.

The CPU 21 controls the components in the MFP 3 and executes various calculations according to programs and data stored in the ROM 22. The RAM 23 is a main memory device, which can be directly accessed by the CPU 21. The operation/display unit 24 includes a touch-sensitive panel 25, which displays information concerning behaviors and configuration of the MFP 3, and buttons (not shown), which are touched by a user to enter necessary instructions and information to manipulate the MFP 3. The reader unit 28 includes an image sensor (not shown), by which an image appearing on the original sheet is scanned, and generates image data representing the scanned image. The printer unit 17 prints an image on a recording medium.

Next, a procedure to set the parameters for the setting items in the scan-handling program according to the user's preference in the PC 2 will be described. When the parameters are to be set, the user activates the scan-handling program in the PC 2 and enters predetermined instruction to invoke a scanning configuration setting window 50 (see FIG. 2) in the display unit 16.

In the scanning configuration setting window 50, a setting window A1 is displayed initially. The user can start setting the parameters in the setting items from the setting window A1 being an initial window.

In the present embodiment, the setting items, of which parameters can be set in the PC 2 include a size of the original sheet, a quantity of colors, contrast, brightness, and a resolution to read the image by the MFP 3. Therefore, the scanning configuration setting window 50 presents a plurality of configuration display/input areas 51-55, through which the parameters for these setting items can be selected and entered. Further, the scanning configuration setting window 50 presents set/cancel input area 56, through which confirmation or cancellation of the selected parameters is entered.

Figure 2:
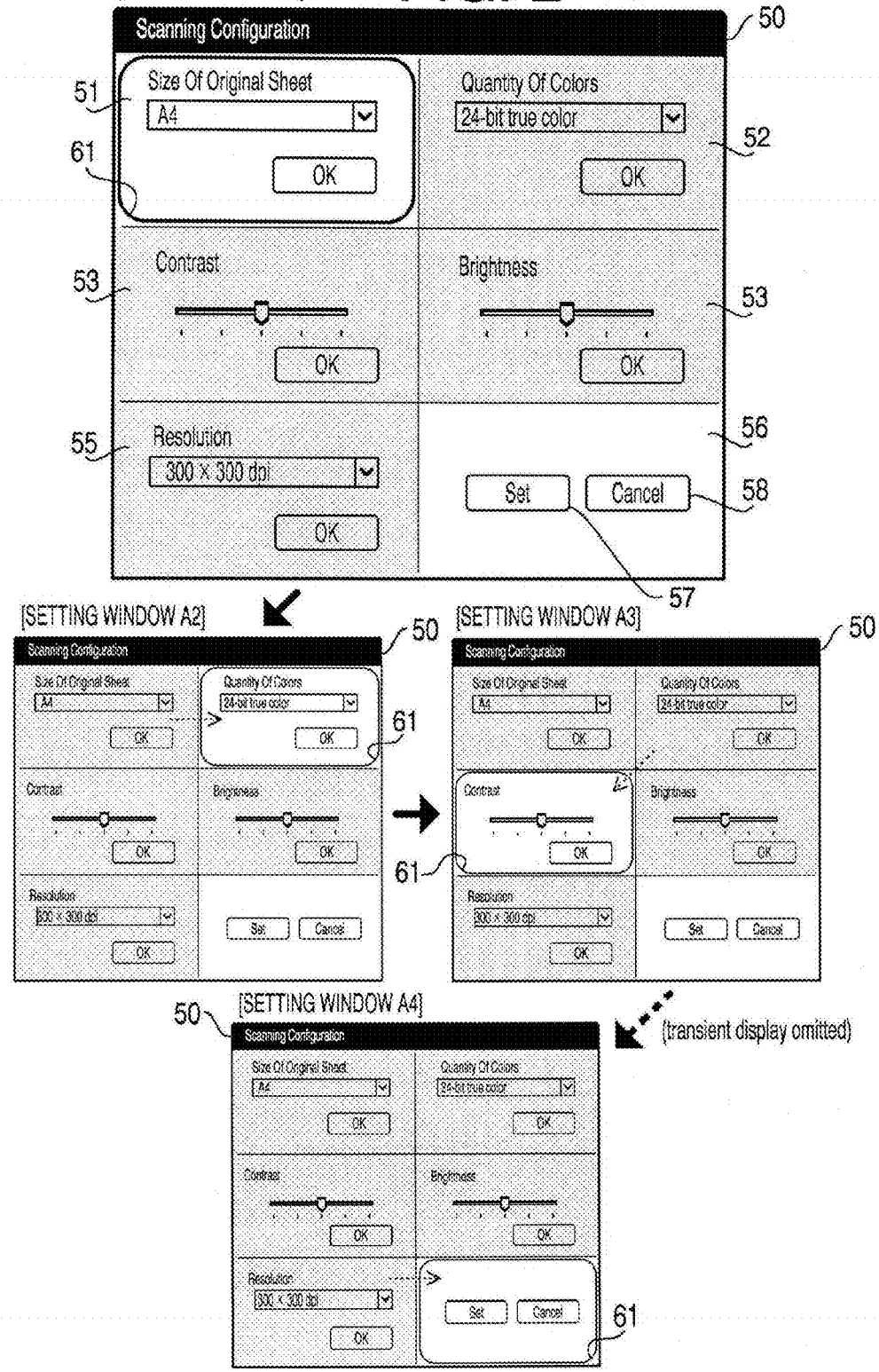
FIG. 2 illustrates a basic flow of highlighting frames in a scanning configuration setting window to be displayed in the information processing system according to the embodiment of the present invention.

A sheet size configuration display/input area 51 is an area, through which available parameters for the size of the original sheet to be scanned are presented and the user's selection for the size is entered. As shown in FIG. 2, the available parameters are presented in a dropdown menu, and the user can select one of the available parameters. In particular, when the user selects one of the available parameters displayed in the dropdown menu in the sheet size configuration display/input area 51 and presses (clicks on) an OK button in the sheet size configuration display/input area 51, the selected size of the original sheet is provisionally entered to be reserved. The selected size of the original sheet is confirmed conclusively as a final selection when a set button 57 in the set/cancel input area 56 is pressed by the user.

A color quantity configuration display/input area 52 is an area, through which available parameters for the quantity of colors are presented and the user's selection for the quantity is entered. As shown in FIG. 2, the available parameters are presented in a dropdown menu, and the user can select one of the available parameters. In particular, the available parameters include monochrome, a grayscale, a 256-scaled grayscale, a 256-scaled color, a 24-bit true color (16 million colors). When the user selects one of the available parameters displayed in the dropdown menu in the color quantity configuration display/input area 52 and pressed an OK button in the color quantity configuration display/input area 52, the selected quantity is provisionally entered to be reserved.

A contrast configuration display/input area 53 is an area, through which the user's selection for the contrast is entered. As shown in FIG. 2, a value representing the user's preferred contrast can be set by use of a slider knob. In particular, the user can move the slider knob to a preferred position. When the user releases the slider knob at the preferred position in the contrast configuration display/input area 53 and pressed an OK button in the contrast configuration display/input area 53, a value indicated by the slider knob is provisionally entered to be reserved.

A brightness configuration display/input area 54 is an area, through which the user's selection for the brightness is entered. As shown in FIG. 2, a value representing the user's preferred brightness can be set by use of a slider knob. In particular, the user can move the slider knob to a preferred position. When the user releases the slider knob at the preferred position in the brightness configuration display/input area 54 and pressed an OK button in the brightness configuration display/input area 54, a value indicated by the slider knob is provisionally entered to be reserved.

A resolution configuration display/input area 55 is an area, through which available parameters for the resolution are presented and the user's selection for the resolution is entered. As shown in FIG. 2, the available parameters are presented in a dropdown menu, and the user can select one of the available parameters. In particular, the available parameters range escalatory from 100 dpi (more specifically, 100 dpi by 100 dpi) to 19,200 dpi. When the user selects one of the available parameters displayed in the dropdown menu in the resolution configuration display/input area 55 and pressed an OK button in the resolution configuration display/input area 55, the selected resolution is provisionally entered to be reserved.

The set/cancel input area 56 is an area, through which the user's selections made in the areas 51-55 are finally entered to be fixed or cancelled. The set/cancel input area 56 includes a set button 57 and a cancel button 58.

When the user presses the set button 57 in the scanning configuration setting window 50, the parameters selected in the configuration display/input areas 51-55 are fixed and validated to be the parameters for the setting items. On the other hand, when the user presses the cancel button 58, the parameters selected in the configuration display/input areas 51-55 in the scanning configuration setting window 50 are invalidated. When one of the set button 57 and the cancel button 58 is pressed, the display unit 16 stops displaying the scanning configuration setting window 50 and returns to the main menu.

The initial appearance of the scanning configuration setting window 50, which is displayed when the scanning configuration setting window 50 is invoked, is shown in the setting window A1 shown in FIG. 2. In the initial condition shown in FIG. 2, predetermined default values are set for each setting item. However, the default values may not necessarily be displayed in the initial condition which follows the invocation of the scanning configuration window 50. For example, the parameters which were selected in a previous setting procedure may be displayed in the scanning configuration window 50 in the initial condition after the current invocation of the scanning configuration window 50.

As the user selects the parameters for the setting item through the setting window A1, the appearance of the scanning configuration setting window 50 is switched one after another from the setting window A1 to, for example, the setting window A2, the setting window A3, and finally to the setting window A4. When the set button 57 is pressed in the setting window A4, the selected parameters are fixed.

In the meantime, when the scanning configuration setting window 50 includes a plurality of setting items, such as a size of the original sheet, a quantity of colors, contrast, brightness, and a resolution, it may be difficult for a user to find correct priority to set the parameters for the plurality of setting items.

Therefore, in the present embodiment, a parameter for a setting item which is to be selected earlier than the other setting items is emphatically displayed in a highlighted appearance with a frame 61. Meanwhile, the other setting items, of which parameters can be selected later, are displayed in a regular (de-emphasized) grayed-out appearance with no frame, in order to avoid the user's input to these input areas. Thus, the user is prompted to set the setting item which is to be selected earlier prior to the other setting items. In this regard, the set/cancel input area 56 is not subject to the emphasized or de-emphasized display. When the OK button is pressed within the framed configuration display/input area, the frame 61 moves on to a next configuration display/input area presenting a next setting item. Thus, each time the OK button is pressed for the setting item, the configuration display/input area to be highlighted with the frame is switched from one to another, and the user is directed to select parameters for the highlighted setting items in the order of the highlighted display.

More specifically, the highlighted displays with the frame 61 are switched in the order illustrated in FIG. 2. That is, when the setting window A being the initial display of the scanning configuration setting window 50 is displayed, the sheet size configuration display/input area 51 is highlighted with the frame 61, and the other areas for the other setting items are displayed in the grayed-out format. Thus, the user's attention is drawn to the sheet size configuration display/input area 51, and it is recognizable for the user to select the size of the original sheet firstly.

When the user selects the size of the original sheet and presses the OK button in the setting window A1, the selected size of the original sheet is provisionally reserved. Thereafter, the highlighting frame 61 moves on to the color quantity configuration display/input area 52, and the other areas for the other setting items, including the sheet size configuration display/input area 51, are displayed in the grayed-out format. Thus, the user's attention is drawn to the color quantity configuration display/input area 52, and it is recognizable for the user to select the quantity of colors secondly.

When the user selects the quantity of colors and presses the OK button in the setting window A2, the selected color quantity is provisionally reserved. Thereafter, the highlighting frame 61 moves on to the contrast configuration display/input area 53, and the other areas for the other setting items, including the color quantity configuration display/input area 52, are displayed in the grayed-out format. Thus, the user's attention is drawn to the contrast configuration display/input area 53, and it is recognizable for the user to select the contrast thirdly.

Thereafter, the highlighting frame 61 moves on in a sequence from the contrast configuration display/input area 53 to the brightness configuration display/input area 54, from the brightness configuration display/input area 54 to the resolution configuration display/input area 55, and from the resolution configuration display/input area 55 to the set/cancel input area 56.

In the present embodiment, the highlighting frame 61 moves on from one to another in the predetermined sequence mentioned above. The sequence is determined in consideration of various possible factors depending on types of the setting items in the scanning configuration setting window 50 so that even an unfamiliar user should be directed to set the parameters smoothly and should benefit from the operability and convenience.

Meanwhile, another user may not wish to set the parameters for the setting item presented currently in the highlighting frame 61 but may wish to set the parameters for different setting items, which are to be displayed in the highlighted frame 61 later. In particular, an experienced user may not necessarily wish to follow the predetermined setting sequence but may demand to set the parameters without the restriction of the predetermined sequence.

Therefore, in consideration of such user's demand, in the present embodiment, the highlighting frame 61 can be moved from the currently highlighting configuration display/input area to another configuration display/input area arbitrarily, for example, by moving a pointer to the desired configuration display/input area and clicking on thereat via the mouse. Accordingly, the desired configuration display/input area is highlighted with the frame 61 and is enabled to accept the user's selection concerning the setting item.

Thus, according to the setting window A1 in FIG. 2, the user is firstly prompted to select the size of original sheet, and thereafter, the quantity of colors according to the predetermined sequence. However, when the user wishes to, for example, select a parameter for contrast without selecting the size of original sheet or other intermediate setting items (i.e., the quantity of colors), the user may move the highlighting frame 61 from the sheet size configuration display/input area 51 to the contrast configuration display/input area 53 to designate the contrast configuration display/input area 53. Thereby, the user is allowed to select the parameter for the contrast directly without setting the size of original sheet or the quantity of colors.

Meanwhile, the set button 57 and the cancel button 58 are ready to be pressed anytime regardless of the predetermined sequence. Therefore, the user is allowed to fix or cancel the selected parameters at a desired timing. However, between two or more setting items, the provisionally reserved parameters may conflict with one another. In other words, a parameter entered for one of the setting items may not cope with another provisionally reserved parameter. When such a conflict occurs, the set button 57 is displayed in the grayed-out form and cannot accept the user's confirmation.

Next, occurrence the conflict and a method to clear the conflict will be described. In the present embodiment, as has been described above, the items configurable through the scanning configuration setting window 50 include a quantity of colors and a resolution. These items include some parameters, which do not cope with each other and therefore are not to be set simultaneously in combination. There are some combinations of the parameters prepared for the quantity of colors and the parameters prepared for the resolution, which cannot be accepted simultaneously. For example, when a parameter of 256-scaled color is selected for the quantity of colors, a parameter for the resolution is automatically limited to 600 dpi or smaller. Therefore, when the parameter of 256-scaled color is selected for the color quantity, and when a parameter of 2400 dpi is selected for the resolution, these parameters conflict with each other.

The parameters, which may conflict in combination between two or more setting items, are not limited to the example mentioned above but include more. For example, when a parameter for contrast is changed to a value different from the initial (default) value, available parameters for the color quantity to cope with the contrast other than the default value are limited to the 24-bit true color, the 256-scaled grayscale, and the grayscale. Therefore, for example, when the parameter for contrast is changed from the default value, and when the parameter of 256-scaled color is selected for the color quantity, these parameters conflict.

In order to overcome these conflicts, in the present embodiment, a warning message is displayed to notify the user of the conflict. Further, the highlighting display is moved to the configuration display/input area for one of the setting items, of which selected parameters are in conflict, and the user is prompted to change the once selected parameter to a coping parameter.

Figure 4:
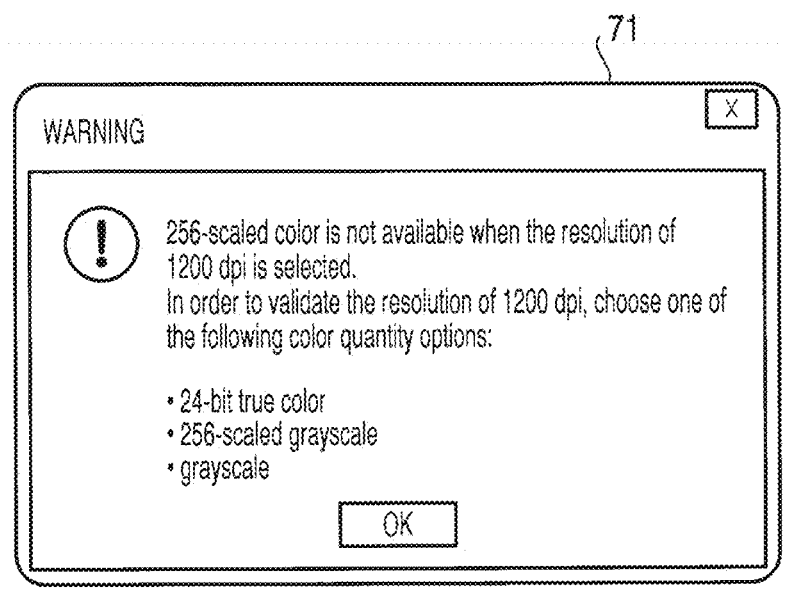
FIG. 4 is an illustrative view of a warning window, which is displayed when the conflict occurs, in the information processing system according to the embodiment of the present invention.

An example for overcoming the conflict will be described with reference to FIG. 3. A setting window B1 shown on top in FIG. 3 illustrates the scanning configuration setting window 50 after the parameter of 256-scaled color is selected for the color quantity and the highlighting frame 61 is moved to the resolution configuration display/input area 55. In the resolution configuration display/input area 55, the user intends to select a parameter of 1200 dpi, which conflicts with the 256-scaled color. Therefore, when the user selects the parameter of 1200 dpi, a popup warning window 71 as shown in FIG. 4 is displayed.

Through the warning window 71, the user is notified of messages that the parameter of 1200 dpi and the parameter of 256-scaled color are in conflict with each other, and that one of the parameters 24-bit true color, 256-scaled grayscale, and grayscale should be selected if the user wishes to select the parameter of 1200 dpi for the quantity of colors. Thus, the user is prompted to change the once-reserved selection for the color quantity.

While the warning window 71 is displayed, in the scanning configuration setting window 50, a setting window B2 as shown in a lower part in FIG. 3 is displayed. In the setting window B2, the highlighting display is moved from the resolution configuration display/input area 55 to the color quantity configuration display/input area 52, of which parameter for the setting item reserved earlier is in conflict with the parameter 1200 dpi of the resolution. In this regard, however, the highlighting frame 61 is replaced with a conflict indicating frame 62, which is drawn in a different format from the regular highlighting frame 61. In other words, the highlighting display is moved to the configuration display/input area, of which once-selected parameter needs to be changed. Thus, the conflict between the two selected parameters is displayed to the user to be more easily recognized. In the present embodiment, the conflict indicating frame 62 is drawn in a chain-and-dot line, while the highlighting frame 61 was drawn in a solid line.

Further, when the two parameters conflict, as seen in the setting window B2, the set button 57 is displayed in the grayed-out format, and the user's press on the set button 57 is not accepted until the conflict is overcome. While the scanning configuration setting window 50 remains displayed, the warning window 71 is displayed in an area adjacent to the scanning configuration setting window 50 or in an area, in which the warning window 71 is laid partially over the scanning configuration setting window 50. The warning careen 70 is closed when an OK button in the warning window 71 is pressed or when one of the conflicting parameters is modified. However, the scanning configuration setting window 50 may not necessarily be maintained displayed while the warning window 71 is displayed but may be, for example, closed when the warning window 71 pops up. For another example, the warning window 71 may not necessarily be closed by the press on the OK button but may be maintained displayed until the conflict is overcome.

When the conflict as shown in the setting window B2 occurs, and when, for example, the user modifies the quantity of color to 24-bit true color, as shown in a setting window B3 on top of FIG. 5, and presses the OK button, the conflict is cleared. Therefore, the conflict indicating frame 62 is replaced with the regular highlighting frame 61, and the highlighting display is moved to a next area, which is an area to be framed following the configuration display/input area having been framed at the time when the conflict occurred. In the above example, the resolution configuration display/input area 55 was framed when the conflict occurred (see the setting window B1 in FIG. 3), and the set/cancel input area 56 was the area to be framed following the resolution configuration display/input area 55 according to the predetermined sequence. Therefore, when the conflict is solved, the set/cancel input area 56 is framed by the highlighting frame 61. In this regard, the set/cancel input area 56 is released from the gray-out display and is enabled to accept the user's press. After the conflict is cleared, the area, to which the highlighting frame 61 is placed, may not necessarily be the next area to be framed following the configuration display/input area having been framed when the conflict occurred but may be the area having been framed when the conflict occurred.

Figure 6:
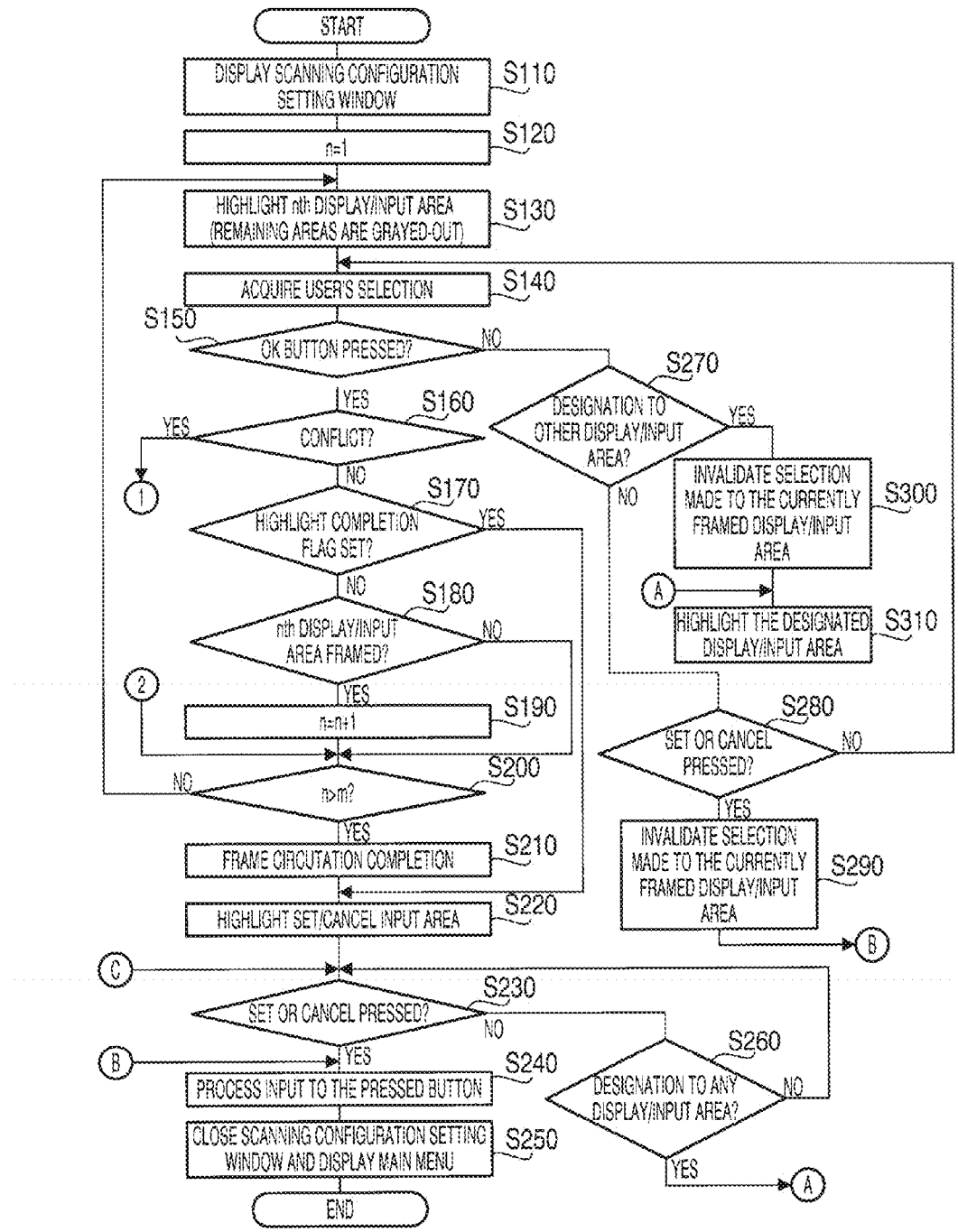
FIG. 6 is a flowchart to illustrate a first part of a flow of scanning configuration setting steps to be executed in a PC in the information processing system according to the embodiment of the present invention.
Figure 7:
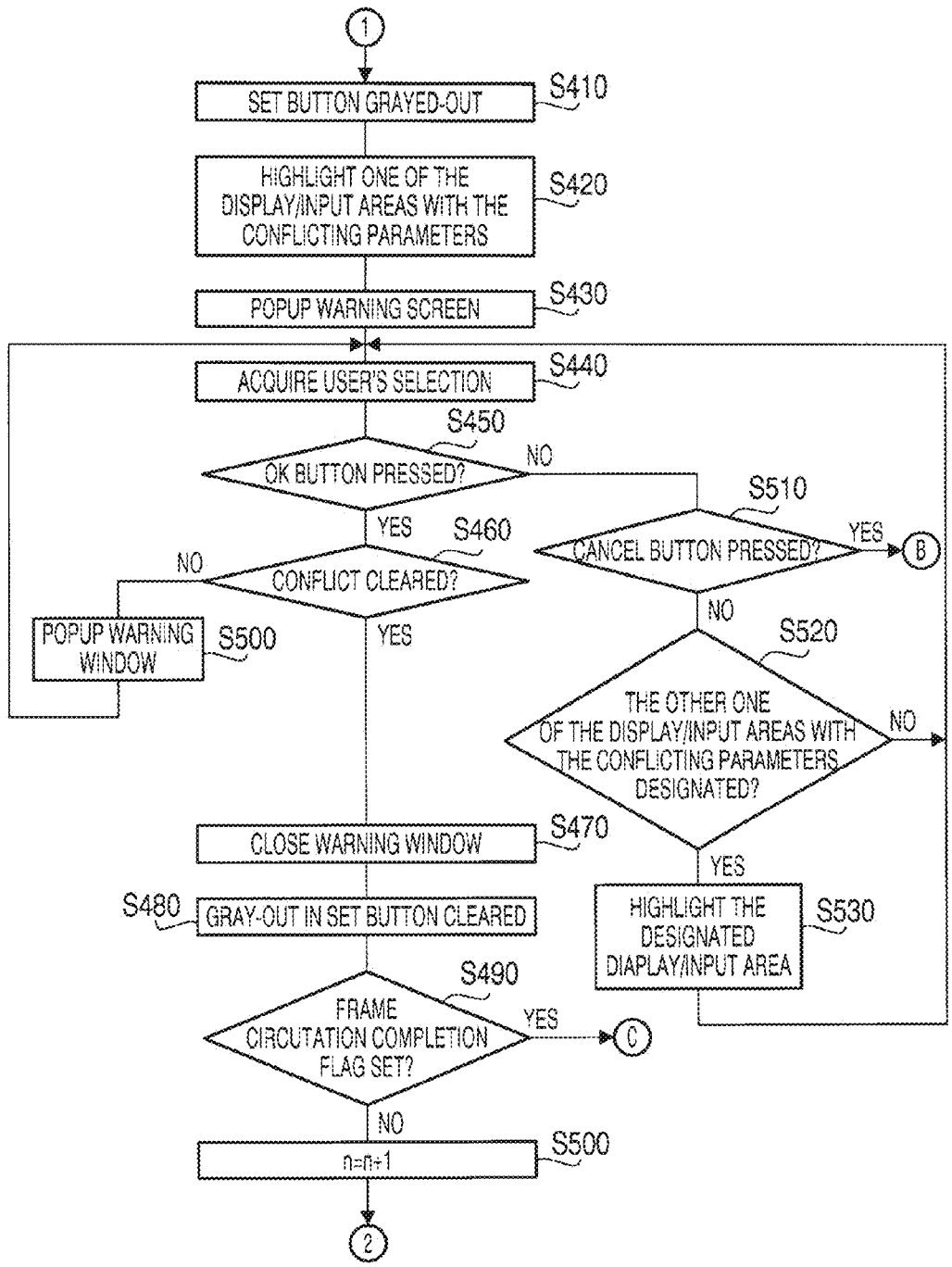
FIG. 7 is a flowchart to illustrate a second part of the flow of scanning configuration setting steps to be executed in the PC in the information processing system according to the embodiment of the present invention.

Next, a flow of scanning configuration setting steps, which are to be executed by the PC 2 to set the parameters for the setting items, including the behaviors of the highlighting display and detecting and clearing of the conflict, will be described with reference to FIGS. 6 and 7. The flow of scanning configuration setting steps is conducted in accordance with one of the scan-handling programs and is activated when the user activates the scan-handling program in the PC 2 and enters predetermined instruction to invoke a scanning configuration setting window 50 (see FIG. 2) in the display unit 16.

In the scanning configuration setting flow, in S110, the CPU 11 manipulates the display unit 16 to display the scanning configuration setting window 50. In particular, the CPU 11 controls the display unit 16 to display the setting window A1 shown in FIG. 2. In S120, a display order variable "n" is set to 1. The scanning configuration setting window 50 includes "m" pieces of display/input areas 51-56 in total; therefore, m is 6 in the present embodiment. Further, one of numbers ranging from 1 to m (i.e., 6) is assigned to each of the six display/input areas 51-56, and the number assigned to each of the display/input areas 51-56 represents an order to be framed in the predetermined sequence. In other words, the highlighting frame 61 is moved in circuit in the scanning configuration setting window 50 in accordance with the order of the assigned numbers in principle. In particular, the sheet size configuration display/input area 51 to be framed firstly has the number 1, the color quantity configuration display/input area 52 to be framed secondly has the number 2, the contrast configuration display/input area 53 to be framed thirdly has the number 3, the brightness configuration display/input area 54 to be framed fourthly has the number 4, the resolution configuration display/input area 55 to be framed fifthly has the number 5, and the set/cancel input area 56 to be framed has the number 6. Meanwhile, the display order variable n indicates the number assigned to the display/input areas 51-56 which is to be currently framed by the highlighting frame 61.

In S130, the display/input area having the number consistent with the number n is displayed, and the other display/input areas are displayed in the grayed-out format. Since the display order variable n is set to be 1 in S120, when the flow comes to S130 for the first time in the scanning configuration setting process, as shown in the setting window A1 in FIG. 2, the sheet size configuration display/input area 51 with the number 1 in the order is highlighted by the highlighting frame 61.

In S140, the CPU 11 receives the selection made by the user who manipulates the input unit 15, for example, via the mouse (not shown). In S150, the CPU 11 judges whether the OK button in the framed display/input area is pressed by the user.

In S150, if the OK button is not pressed (S150: NO), the flow proceeds to S270. In S270, the CPU 11 judges whether a display/input area different from the currently framed display/input area (i.e., the sheet size configuration display/input area 51) is designated by pointing via the mouse. If no other display/input area is pointed (S270: NO), in S280, the CPU 11 judges whether one of the set button 57 and the cancel button 58 is pressed. If neither of the buttons 57, 58 is pressed (S280: NO), the flow returns to S140. If one of the buttons 57, 58 is pressed (S280: YES), the flow proceeds to S290. In S290, modification made to the parameter for the setting item in the currently framed display/input area is invalidated. The flow proceeds to S240.

In S240, input for the button having been pressed in S230 is processed. That is, when the set button 57 is pressed in S230, the currently entered parameters, including the provisionally reserved parameters, are confirmed and fixed. Thereby, the fixed parameters are forwarded to the MFP 3, and the MFP 3 receiving the fixed parameters reads an image with reference to the received parameters. On the other hand, if the cancel button 58 is pressed in S230, in S240, the parameters modified or maintained since the activation of the scanning configuration setting flow are invalidated. Thereafter, in S250, the scanning configuration setting window 50 is closed, and the initial main menu is displayed. The scanning configuration setting flow is terminated thereafter.

In S270, if any other display/input area is pointed (S270: YES), in S300, modification made to the parameter for the setting item in the currently framed display/input area is invalidated. Therefore, if any other display/input area than the currently framed display/input area is pointed without pressing the OK button in the currently framed display/input area, the modification made in the currently framed display/input area is invalidated. Thereafter, in S310, the highlighting frame 61 is moved to the display/input area designated in S270. The flow returns to S140.

When another display/input area is designated, and the highlighting display with the highlighting frame 61 is switched to the newly designated display/input area without pressing the OK button in the currently framed display/input area, the current display order variable n becomes different from the number assigned to the newly designated display/input area being framed. In other words, the newly designated display/input area is not the display/input area with the n-th number.

Meanwhile, in S150, if the OK button in the framed display/input area is pressed (S150: YES), in S160, the CPU 11 judges whether a conflict occurs among the parameters having been reserved for the setting items. If no conflict is occurring (S160: NO), in S170, the CPU 11 judges whether a frame circulation completion flag is set.

The frame circulation completion flag is a flag, which is set in 5210 when the frame completes moving around all through the input areas 51-56. Therefore, when the frame circulation completion flag is set, it is recognized that the set/cancel input area 56 is currently framed.

In S170, when the frame circulation completion flag is set (S170: YES), the flow proceeds to S220. When the frame circulation completion flag is not set (S170: NO), the flow proceeds to S180. In S180, the CPU 11 judges whether the number assigned to the currently framed display/input area is consistent with the display order variable n. In other words, the CPU 11 judges whether the display/input areas 51-55 has been framed in accordance with the predetermined sequence.

In S180, if the number assigned to the currently framed display/input area is consistent with n (S180: YES), in S190, the display order variable n is incremented by 1. The flow proceeds to S200. In S200, it is judged whether the display order variable n is greater than the quantity m of display/input areas 51-56. Thus, it is examined whether the highlighting frame 61 has reached the last and m-th display/input area (e.g., the sixth set/cancel input area 56). If the variable n is smaller than the quantity m (S200: NO), it is recognized that the highlighting frame has not reached the last and m-th display/input area. Therefore, the flow returns to S130, and the highlighting frame 61 moves to the next display/input area according to the predetermined sequence and resumes the circulation. On the other hand, if the highlighting frame 61 has reached to the last and m-th display/input area, the display order variable n (n=m+1) should be greater than the quantity m of the input areas (n>m) (S200: YES). The flow proceeds to S210, in which the frame circulation completion flag is set.

In S180, if the number assigned to the currently framed display/input area is not consistent with n (S180: NO), the flow skips 5190 so that the display order variable n is not incremented, and the flow proceeds to S200. In this flow, if the display order variable n has been already greater than the quantity m of the display/input areas (n>m), the flow proceeds to S210. On the other hand, if the display order variable n is not greater than the quantity m of the display/input areas yet (n<m), that is, if the highlighting display has not reached the last and m-th display/input area, the flow returns to S130. Thus, the highlighting frame 61 returns to the display/input area with the number being consistent with n.

In S180, negative judgment (S180: NO) is made when the flow takes the route from S150 to S300 and S310 via S270 or a route from S230 to S310 via S260, which will be described later. In either route, the highlighting display has been moved to a display/input area, which is different from the display/input area having the number consistent with the current display order variable n. That is, the display order variable n and the number assigned to the currently framed display/input area become inconsistent. In such cases, as long as the display order variable n is not greater than the quantity m of the display/input areas (S200: NO), the flow returns to S130 without incrementing the display order variable n. Thus, the highlighting display in accordance with the predetermined sequence is resumed.

Following S210, in which the frame circulation completion flag is set (S210: YES), in S220, the highlighting frame 61 is moved to the set/cancel input area 56. In S230, the CPU 11 judges whether one of the set button 57 and the cancel button 58 is pressed. If one of the buttons 57, 58 is pressed (S230: YES), the flow proceeds to S240. In S240, input for the button having been pressed in S230 is processed. Thereafter, in 5250, the scanning configuration setting window 50 is closed, and the initial main menu is displayed. The scanning configuration setting flow is terminated thereafter.

Meanwhile, in S230, if neither of the set button 57 nor the cancel button 58 is pressed (S230: NO), in S260, the CPU 11 judges whether any display/input area different from the currently framed display/input area is designated. While the user is making selections through the scanning configuration setting window 50, and before the user finally presses the set button 57 to confirm the selections or the cancel button 58, it is possible that the user may reconsider the selections and, for example, wish to increase the resolution. In such a case, the user may designate the resolution display/input area 55 to modify the once-reserved parameter for the resolution. Therefore, in consideration of such behavior of the user, the judgment in S260 is made. In S260, when any one of display/input areas 51-55 other than the set/cancel input area 56 is designated (S260: YES), the flow proceeds to S310. In S310, the highlighting frame 61 is moved to the designated display/ input area to accept modification to the once-reserved parameter for the setting item in the designated display/input area.

Next, a flow of steps S4010-S530, which follows S160, when the CPU 11 determines that a conflict is occurring among the parameters having been reserved in the scanning configuration setting window 50 (S160: YES), will be described with reference to FIG. 7. In the present embodiment, when the conflict occurs (S160: YES), and until the conflict is cleared, the parameters which can be modified are limited to those conflicting parameters, and the other coping parameters cannot be modified.

In S410, the set button 57 is displayed in the grayed-out format. Thus, the set button 57 is disabled until the conflict is cleared. In S420, one of the display/input areas for the setting items, of which once-reserved parameters are conflicting, is framed to be highlighted. In other words, a display/input area for one of the setting items, of which conflict can be cleared by modification to one of the reserved parameters, is highlighted. In this regard, the display/input area to be highlighted is framed by the conflict indicating frame 62 rather than the highlighting frame 61.

In the present embodiment, thus, when the user selects a parameter for one of the setting items earlier (formerly) and a parameter for another one of the setting items later, the two parameters may conflict with each other. When the user selects the later-entered parameter through a currently framed display/input area "A", and the later-entered parameter conflicts with the formerly-entered parameter, which is reserved earlier through a display/input area "B", the highlighting display (i.e., the conflict indicating frame 62) is moved to the display/input area "B" for the former parameter so that the user is prompted to modify the former parameter. However, it may not necessary be the formerly-entered parameter that is to be modified, but the later-entered parameter may be modified. In such a case, the highlighting display may be maintained, but may be replaced with the conflict indicating frame 62, at the currently framed display/input area "B" with the later-entered parameter.

Following S420, in S430, the popup warning window (see FIG. 4) is displayed, and in S440, the user's selection to the once-entered parameter is received. Thus, modification to the formerly-entered parameter for the setting item, which conflicted with the later-entered parameter, is reserved.

In S450, the CPU 11 judges whether the OK button in the currently framed display/input area is pressed. If the OK button is not pressed (S450: NO), in S510, the CPU 11 judges whether the cancel button 58 is pressed. If the cancel button 58 is pressed (S510: YES), the flow proceeds to S240 (see FIG. 6). If the cancel button 58 is not pressed (S510: NO), in S520, the CPU 11 judges whether the display/input area for the later-entered parameter between the two conflicting parameters is designated. The judgment in S520 is made because the user may rather modify the later-entered parameter than the formerly-entered parameter in order to settle the conflict.

In S520, if the display/input area for the later-entered parameter is not designated (S520: NO), the flow returns to S440. If the display/input area for the later-entered parameter is designated (S520: YES), the conflict indicating frame 62 is moved to the display/input area for the later-entered parameter. The flow returns to S440.

Meanwhile, in S450, if the OK button is pressed (S450: YES), in S460, the CPU 11 judges whether the conflict is cleared. If the conflict is not cleared yet (S460: NO), in S500, the popup warning window is displayed, and the flow returns to S440. In S440, if the content of the warning displayed in S430 remains unchanged, the warning message is maintained displayed. If the content of the warning has changed after the previous round of S440, the warning message to be displayed is changed. In other words, a new warning message reflecting the currently occurring conflict is displayed.

In S460, if the conflict is cleared (S460: YES), in S470, the warning window is closed. Thereafter, in S480, the set button 57 is released from the gray-out display and is enabled to accept the user's press. In S490, the CPU 11 judges whether the frame circulation completion flag is set. If the frame circulation completion flag is set (S490: YES), the flow proceeds to S230 (see FIG. 6). If the frame circulation completion flag is not set (S490: NO), in S500, the display order variable n is incremented by 1. The flow proceeds to S200.

As has been described, according to the PC 2 in the present embodiment, when the scanning configuration setting window 50 is activated, one of the plurality of display/input areas 51-56 is highlighted with the frame, and each time the OK button is pressed within the display/input area, the frame is moved in circulation according to the predetermined sequence. Therefore, both an experienced user and a user who is not familiar with the behaviors of the PC 2 can easily input the selections for the parameters. Thus, both the experienced and less-experienced users can effectively benefit from the operability and the convenience.

According to the above-described embodiment, the highlighting display is not necessarily switched automatically in accordance with the predetermined sequence, but the highlighting display may be moved to an arbitrary display/input area to accept the user's preference to specifically input parameters for the arbitrary setting items. Therefore, the user may manually pick specific setting items to set the parameters regardless of the predetermined sequence. Thus, even the experienced user can benefit from the improved operability and the convenience.

According to the above-described embodiment, the plurality of setting items can be recognized through the single scanning configuration setting window 50. Therefore, the user who is not familiar with the behaviors or configuration of the PC 2 can benefit from the format similar to the wizard format to easily set the parameters. Meanwhile, the experienced user can manually select the setting items, of which parameters should be specifically modified. Thus, a user interface, which is useful and convenient to users in a wide range, is provided.

Further, according to the above-described embodiment, when a conflict between once-entered parameters occurs, the user is warned by the warning window and is prompted to modify the once-entered parameters. In this regard, the user's attention is drawn to the display/input area for the setting item, of which reserved parameter might need to be modified, by the conflict indicating frame 62. Therefore, even when an unexpected conflict between the parameters occurs, the user can recognize the conflict promptly and clearly. Thus, a correct action to clear the conflict can be promptly conducted.

Although an example of carrying out the invention has been described, those skilled in the art will appreciate that there are numerous variations and permutations of the image display controlling device and the display controlling method that fall within the spirit and scope of the invention as set forth in the appended claims. It is to be understood that the subject matter defined in the appended claims is not necessarily limited to the specific features or act described above. Rather, the specific features and acts described above are disclosed as example forms of implementing the claims.

For example, the highlighting display may not necessarily be switched in circulation according to the predetermined sequence but may be switched regardless of the sequence according to relevance with a previously set parameter. For example, when a parameter for one of the setting items is reserved by the OK button, the CPU 11 may determine a next setting item to be set in consideration of the relevance of the setting item with the reserved parameter and switches the highlighting display to the display/input area for the determined setting item.

For another example, while one of the display/input areas is highlighted, when the user designates another one of the display/input areas which is out of the predetermined sequence, the highlighting frame 61 may not necessarily be moved to the designated display/input area. That is, the highlighting frame 61 may remain at the currently highlighting display/input area to keep the predetermined sequence while the designated display/input area is enabled to accept the user's selection for a parameter.

For another example, the highlighting display may not necessarily be circulated through all of the setting items but may be circulated through a limited number of setting items, of which parameters are mandatory or considered to be particularly more important, among all the setting items.

For another example, modification made to the parameter presented in the currently highlighted display/input area may be validated even when the OK button is not pressed in the highlighted display/input area (S150: NO) but when the set button 57 is pressed (S280: YES). In particular, in the flow described above, in S150, when the OK button is not pressed in the currently highlighted display/input area (S150: NO), and when the set button 57 is pressed in S280 (S280: YES), in S290, modification made to the parameter entered in the currently highlighted display/input area is invalidated, but the parameters reserved through the other display/input areas and the parameter entered prior to the modification in S140 are fixed. However, in S290, the modification made to the presented parameter may be validated as well as the other parameters reserved through the other display/input areas. In this regard, a conflict may be caused between the reserved parameters and the modified parameter; therefore, it may be necessary that the CPU 11 examines whether a conflict occurs after the set button 57 is pressed in S280. If a conflict is occurring, the CPU 11 may direct the user to modify one of the conflicting parameters to clear the conflict before fixing all the parameters.

Further, for another example, modification made to the parameter presented in the currently highlighted display/input area may be validated even when the OK button is not pressed in the highlighted display/input area (S150) and when another display/input area is designated in S270 (S270: YES). In particular, in the flow described above, in S150, when the OK button is not pressed in the currently highlighted display/input area (S150: NO), and another display/input area is designated in S270 (S270: YES), in S300, modification made to the parameter set in the currently highlighted display/input area is invalidated, and the highlighting display is switched to the designated display/input area in S310. However, in S300, the modification made to the presented parameter may be validated before the highlighting display is moved to the designated display/input area. In this regard, again, a conflict may be caused between the modified parameter and the reserved parameters; therefore, it may be necessary that the CPU 11 examines whether a conflict occurs after another display/input area is designated in S270. If a conflict is occurring, the CPU 11 may direct the user to modify one of the conflicting parameters to clear the conflict before moving the highlighting display to the designated display/input area.

For another example, in the embodiment described above, while two parameters are in conflict, the parameters which can be modified are limited to those conflicting parameters. In other words, the other non-conflicting parameters cannot be modified. However, it is not necessarily limited, but any parameter may be modifiable while two parameters are in conflict. When a non-conflicting parameter is to be modified, the highlighting display may be either maintained at the display/input area wherein the conflicting parameter was selected or moved to the display/input area for the non-conflicting parameter. In the latter case, when the OK button in the display/input area for the non-conflicting parameter is pressed, the highlighting display may be returned to the display/input area wherein the conflicting parameter was selected. Nevertheless, when two parameters are in conflict, it may be preferable that the conflict is cleared before a non-conflicting parameter is modified. Therefore, it may be preferable, as described in the above embodiment, that the modifiable parameters are limited to the conflicting parameters when a conflict is occurring.

Figure 8:
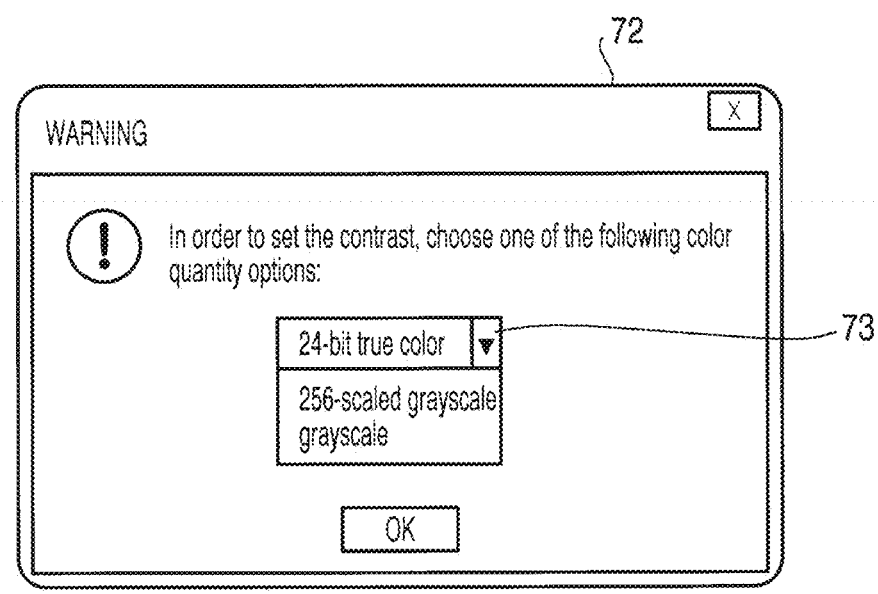
FIG. 8 is another illustrative view of the warning window, which is displayed when the conflict occurs, in the information processing system according to the embodiment of the present invention.

It is to be noted that the appearance of the warning window, which is displayed when a conflict occurs, is merely an example and is not necessarily limited to that shown in FIG. 4. The warning window may, for another example, include a list of available parameters, which can clear the conflict. FIG. 8 shows an example of such a warning window 72, in which a dropdown list 73 showing the available parameters is included. The warning window 72 may be displayed when a conflict occurs between the quantity of colors and the contrast.

In the above-described embodiment, a mouse as an input device is used when the user inputs the parameters through the scanning configuration window 50. However, the input device to input the parameters is not limited to the mouse but may be, for example, a keyboard or a touch-sensitive panel.

The present invention may not necessarily be applied to the scan-handling program for the PC 2 but may be applied to other software program, which requires a user's input to set parameters.

What is claimed is:

1. A display controlling device, comprising:
    a setting window displaying unit configured to control a display device to display a setting window, in which a plurality of display areas are arranged, each of the display areas being configured to display a different setting item;
    an input receiving unit configured to receive input of a setting value for the setting item; and
    a display controlling unit configured to display one of the display areas in a distinguishable appearance, in which the one of the display areas is presented to be distinguishable from the remainder of the display areas, while the remainder of the display areas is displayed in a regular appearance,
    wherein the display controlling unit switches the one of the display areas being displayed in the distinguishable appearance to be displayed in the regular appearance and another one of the display areas being displayed in the regular appearance to be displayed in the distinguishable appearance in accordance with a predetermined switching manner each time the input of the setting value for the setting item displayed in the one of the display areas being displayed in the distinguishable appearance is received.

2. The display controlling device according to claim 1,
    wherein the display controlling unit switches the distinguishable appearance from the one of the display areas to the another one of the display areas sequentially in accordance with a predetermined order each time the input of the setting value for the setting item displayed in the one of the display areas in the distinguishable appearance is received.

3. The display controlling device according to claim 1, further comprising:
an arbitrary designation accepting unit configured to accept arbitrary designation to the another one of the display areas;
wherein the display controlling unit switches the distinguishable appearance of the display areas from the one of the display areas being displayed in the distinguishable appearance to the designated another one of the display areas when arbitrary designation to the another one of the display areas is accepted by the arbitrary designation accepting unit.

4. The display controlling device according to claim 3,
wherein the display controlling unit switches the distinguishable appearance of the display areas from the designated another one of the display areas to the one of the display areas, which had been displayed in the distinguishable appearance previously and is currently displayed in the regular appearance, when the input of the setting value for the setting item displayed in the designated another one of the display areas currently being displayed in the distinguishable appearance is received.

5. The display controlling device according to claim 1, further comprising:
a conflict judging unit configured to judge whether the setting value for the setting item currently received by the input receiving unit and any other setting values having been set formerly for the other setting items are in conflict, in which the currently-received and formerly-set setting values cannot be set simultaneously; and
a conflict informing unit configured to inform a user of the conflict when the conflict judging unit judges that the setting value for the setting item currently received by the input receiving unit and any other setting values having been set formerly for the other setting items are in conflict.

6. The display controlling device according to claim 5,
wherein the conflict informing unit informs the user of the conflict by controlling the display device to display information indicating the setting items, of which setting values are in conflict.

7. The display controlling device according to claim 5,
wherein, when the conflict judging unit judges that the setting value for the setting item currently received by the input receiving unit and any other setting values having been set formerly for the other setting items are in conflict, the display areas displaying the setting items, of which setting values are in conflict, are placed in exclusive condition to exclude the remainder of the display areas with non-conflicting parameters from being displayed in the distinguishable appearance; and
wherein the display controlling unit displays one of the display areas placed in the exclusive condition in the distinguishable appearance when the conflict judging unit judges that the setting value received by the input receiving unit and any other setting values having been set for the other setting items are in conflict.

8. The display controlling unit according to claim 7,
wherein, while the display controlling unit switches the distinguishable appearance of the display areas sequentially in accordance with the predetermined switching manner, based on a first judgment made by the conflict judging unit that the setting value received by the input receiving unit and any other setting values having been set for the other setting items are in conflict, the display controlling unit interrupts the sequence and displays the one of the display areas in the exclusive condition in the distinguishable appearance; and
wherein, when a second judgment that the conflict is cleared is made by the conflict judging unit, the display controlling unit resumes the sequence in accordance with the predetermined switching manner and switches the distinguishable appearance of the display areas from the one of the display areas in the exclusive condition to the display area having been displayed in the distinguishable appearance at the time when the interruption was made based on the first judgment.

9. The display controlling unit according to claim 7,
wherein, while the display controlling unit switches the distinguishable appearance of the display areas sequentially in accordance with the predetermined switching manner, based on a first judgment made by the conflict judging unit that the setting value received by the input receiving unit and any other setting values having been set for the other setting items are in conflict, the display controlling unit interrupts the sequence and displays the one of the display areas in the exclusive condition in the distinguishable appearance; and
wherein, when a second judgment that the conflict is cleared is made by the conflict judging unit, the display controlling unit resumes the sequence in accordance with the predetermined switching manner and switches the distinguishable appearance of the display areas from the one of the display areas in the exclusive condition to the display area, which was to be displayed in the distinguishable appearance following the display area having been displayed in the distinguishable appearance at the time when the interruption was made based on the first judgment.

10. A method for controlling displays in a display device, comprising:
controlling the display device to display a setting window, in which a plurality of display areas are arranged, each of the display areas being configured to display a different setting item;
receiving input of a setting value for the setting item; and
displaying one of the display areas in a distinguishable appearance, in which the one of the display areas is presented to be distinguishable from the remainder of the display areas, and displaying the remainder of the display areas in a regular appearance,
wherein the distinguishable appearance of the display areas is switched so that the one of the display areas being displayed in the distinguishable appearance is displayed in the regular appearance and another one of the display areas being displayed in the regular appearance is displayed in the distinguishable appearance in accordance with a predetermined switching manner each time the input of the setting value for the setting item displayed in the one of the display areas being displayed in the distinguishable appearance is received.

11. A non-transitory computer usable medium containing computer readable instructions to control a computer to function as:
a setting window displaying unit configured to control a display device to display a setting window, in which a plurality of display areas are arranged, each of the display areas being configured to display a different setting item;

an input receiving unit configured to receive input of a setting value for the setting item; and a display controlling unit configured to display one of the display areas in a distinguishable appearance, in which the one of the display areas is presented to be distinguishable from the remainder of the display areas, while the remainder of the display areas is displayed in a regular appearance, wherein the display controlling unit switches the one of the display areas being displayed in the distinguishable appearance to be displayed in the regular appearance and another one of the display areas being displayed in the regular appearance to be displayed in the distinguishable appearance in accordance with a predetermined switching manner each time the input of the setting value for the setting item displayed in the one of the display areas being displayed in the distinguishable appearance is received.

12. A display controlling device, comprising:

a display unit configured to display information;

an input unit configured to input a setting value for a setting item; and a control device configured to:

control the display device to display a setting window, in which a plurality of display areas are arranged, each of the display areas being configured to display a different setting item;

receive the setting value for the setting item inputted by the input unit; and display one of the display areas in a distinguishable appearance, in which the one of the display areas is presented to be distinguishable from the remainder of the display areas, while the remainder of the display areas is displayed in a regular appearance, wherein the distinguishable appearance of the display areas is switched so that the one of the display areas being displayed in the distinguishable appearance is displayed in the regular appearance and another one of the display areas being displayed in the regular appearance is displayed in the distinguishable appearance in accordance with a predetermined switching manner each time the input of the setting value for the setting item displayed in the one of the display areas being displayed in the distinguishable appearance is received.

* * * * *